US005779123A

United States Patent [19]

Richards

[11] Patent Number: 5,779,123

[45] Date of Patent: Jul. 14, 1998

[54] WEB/RIBBON PATH VERIFIER FOR DETECTING AND IDENTIFYING ERRORS IN A WEB/RIBBON PATH

[75] Inventor: John Sheridan Richards, Barrington, N.H.

[73] Assignees: Heidelberg Harris, Inc., Dover, N.H.; Heidelberger Druckmaschinen AG, Heidelberg, Germany

[21] Appl. No.: 754,771

[22] Filed: Nov. 20, 1996

[51] Int. Cl.$^{6}$ .......................... B65H 26/00; B23Q 15/00; G03B 1/56

[52] U.S. Cl. .................................. 226/1; 226/12; 226/45; 226/91; 226/100; 101/228

[58] Field of Search .................................. 226/1, 12, 10, 226/45, 91, 92, 100; 101/228

[56] References Cited

U.S. PATENT DOCUMENTS

| | | | |
|---|---|---|---|
| 3,123,195 | 3/1964 | Hewitt et al. | 226/45 X |
| 3,323,700 | 6/1967 | Epstein et al. | 226/45 X |
| 3,917,142 | 11/1975 | Guarderas | 226/45 X |
| 3,949,856 | 4/1976 | Ulber et al. | 226/45 X |
| 5,088,403 | 2/1992 | Shoji et al. | 101/227 |
| 5,307,970 | 5/1994 | Shibuya et al. | 226/92 |
| 5,325,774 | 7/1994 | Breton et al. | 101/228 |
| 5,386,772 | 2/1995 | Tolle et al. | 226/45 X |
| 5,542,350 | 8/1996 | Theilacker et al. | 226/45 X |

*Primary Examiner*—Michael Mansen
*Attorney, Agent, or Firm*—Kenyon & Kenyon

[57] ABSTRACT

A rotational detector is attached to each of the rolls that might be passed over or under as part of a paper web/path. Each of the rotational detectors emits an output signal which indicates whether the roll it is attached to is moving and, if it is moving, the direction it is moving. A comparator compares the output from each of the rotational detectors to path requirement data for the path that the pressman intended to web. The comparator determines whether any mistakes have occurred and if an error has occurred the roll on which the mistake has occurred. The comparator then determines whether any of the mistakes which might have occurred are catastrophic, requiring rewebbing. If there are no catastrophic errors, a controller adjusts the register for any deviations from the intended path that might have occurred during webbing.

16 Claims, 3 Drawing Sheets

Fig.1
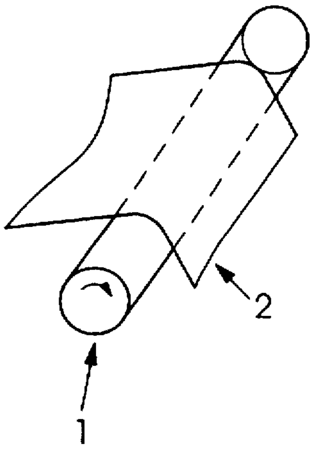
Fig.2
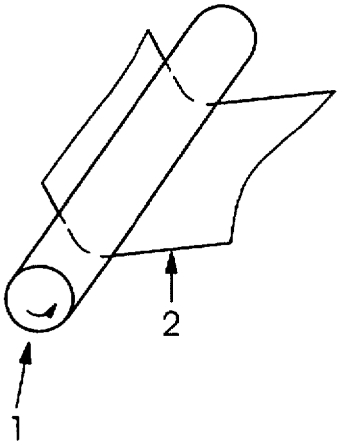
Fig.3
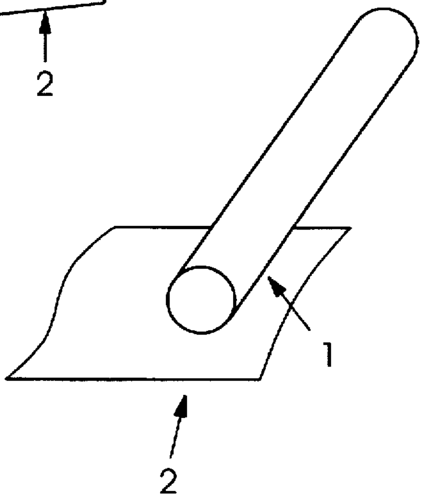
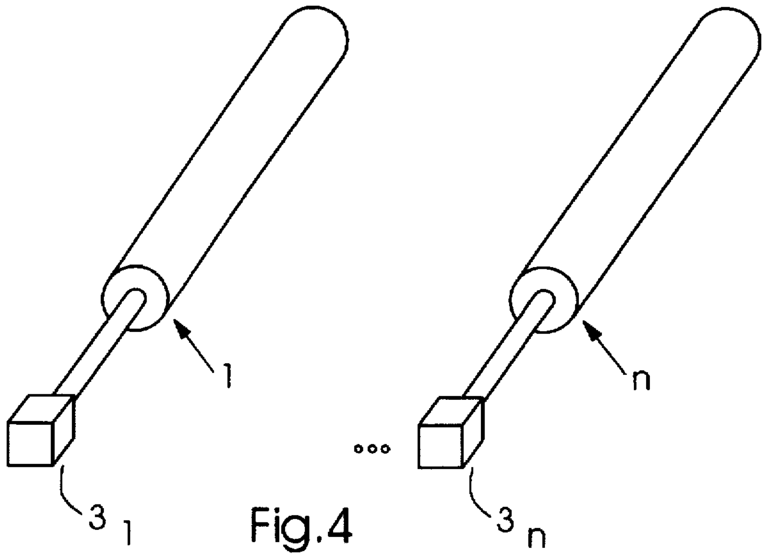
Fig.4

WEB/RIBBON PATH VERIFIER FOR DETECTING AND IDENTIFYING ERRORS IN A WEB/RIBBON PATH

FIELD OF THE INVENTION

The present invention relates to the field of press automation, and particularly to techniques for ensuring the correctness of a web/ribbon path.

BACKGROUND OF THE INVENTION

U.S. Pat. No. 5,325,774 discloses a ribbon path indicator system. In it a remote display device is mounted inside each roll where ribbon path decisions must be made. The remote display devices indicates the identity of the roll, it is mounted in the direction in which the ribbon must be wrapped around that roll and the identity of the next roll to be wrapped. The remote display devices are coupled to controlling means which can change their displays.

U.S. Pat. No. 5,088,403 purports to disclose a marker and a paper web confirming apparatus. The marker is placed in the vicinity of each press unit The marker consists of a marking unit for putting a mark on a paper web and a regulator. The regulator ensures that the mark placed the paper web by the marking unit has a determined phase at all times with respect to the printed image produced during a printing operation. The paper web confirming apparatus consists of a mark detector, a rotational phase signal transmitter, an examination unit, and an alarm. During operation, when the mark detector detects a mark, it passes a signal to the examination unit. The rotational phase signal transmitter passes a signal to the examination unit indicating rotational phase. The examination unit then determines whether the mark signal is within a predetermined permissible range of the rotational phase.

U.S. Pat. No. 5,307,970 purports to disclose a paper web threading apparatus having an abnormality indication alarm. A paper web threading member is secured to a paper web and is automatically driven through a guide member. The guide member has two rail members. Detectors are placed near the holes in the rail members and detect when guide pieces which are connected to the detectors pass through the holes. If a guide piece does not pass through a hole in a predetermined period of time, an abnormality signal is output, the driving mechanism for the paper web is stopped, and an alarm goes off.

SUMMARY OF THE INVENTION

In the art, it has been difficult to quickly determine the mistakes that are made webbing a web/ribbon path. While prior art devices purport to indicate whether mistakes have occurred, they do not indicate what the mistakes are. They also do not indicate whether the mistakes are catastrophic (ie, require rewebbing). They do not automatically correct noncatastrophic mistakes.

In the present invention, an apparatus for determining how a path has been webbed is disclosed. The apparatus compares the actual path a web/ribbon is taking with its intended path. The apparatus determines which rolls, if any, are improperly webbed and determines whether any catastrophic errors have occurred. If a catastrophic error has occurred, the apparatus indicates to its user, that rewebbing is required. If an error(s) has occurred but it is not catastrophic, the apparatus adjusts the register to compensate for the error(s). If no error has occurred, the apparatus indicates that there was no error. Unless a catastrophic error has occurred, the apparatus stores data which indicates how the path was webbed in memory. On rewebbing the apparatus compares the stored data with the actual path the web takes after rewebbing to determine if any errors occurred on rewebbing.

BRIEF DESCRIPTION OF THE DRAWINGS

FIG. 1 shows a web/ribbon passing over a roll.

FIG. 2 shows a web/ribbon passing under a roll.

FIG. 3 shows a web/ribbon missing a roll.

FIG. 4 shows rotational detectors attached to the rolls.

DETAILED DESCRIPTION OF THE INVENTION

A web or ribbon is typically webbed through a variety of rolls. The web/ribbon 2 can pass over a particular roll as shown in FIG. 1. It can pass under a particular roll as shown in FIG. 2, or it can miss a particular roll altogether as shown in FIG. 3.

Whether the web ribbon passes over a particular roll, under a particular roll, or misses it altogether is often up to the pressman's judgment. Often, however, there are particular rolls that must be used in a particular way. For example, in a particular application there may be a particular roll that the web/ribbon must pass over. There may be a particular roll that the web/ribbon must pass under, and/or there may be a particular roll that web/ribbon must miss altogether.

The pressman generally determines the path that the web/ribbon should pass before webbing the web/ribbon. Mistakes, however, are often made, and the actual web/ribbon path often deviates from the intended path. Mistakes frequently occur during rewebbing after a web break, since the webbing is often done in a rush.

If the mistake that has occurred involves one of the rolls which must be used in a certain direction (over or under) or must not be used, the mistake is catastrophic and rewebbing must be redone. If rewebbing did not occur, the final page format of the product might be altered. If, however, the mistake does not involve one of the rolls that must be engaged (or not engaged) in a particular manner, then rewebbing may not be necessary and the mistake can often be corrected or accommodated by changing the register.

In the main embodiment shown in FIG. 4, a rotational detector $\mathbf{3}_{i\,(1 \le i \le n)}$ is attached to each of the n rolls that might be passed over or under as part of a ribbon/web path. The rotational detectors $\mathbf{3}_{1\text{-}n}$ are quadratures. Other similar rotational detectors, however, can also be used as the rotational detectors. Shaft encoders or a.c. generators can be used as the rotational detectors. As an alternative embodiment, the rotational detectors need not be attached to every roll that might be passed over or under. For example, the detectors can be attached solely to the rolls where the designer feels mistakes in webbing are most likely to occur.

Figure 5:
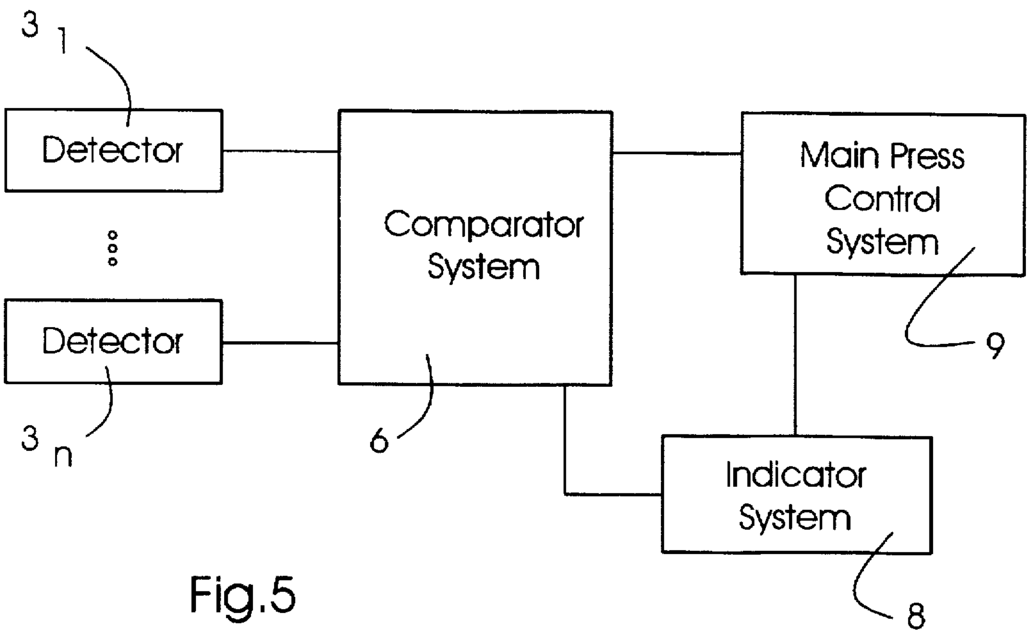
FIG. 5 shows an embodiment of the web/ribbon path verifier. The outputs of the detectors are connected to a comparator system. The comparator system, a main press control system and an indicator system are all interconnected.
Figure 6:
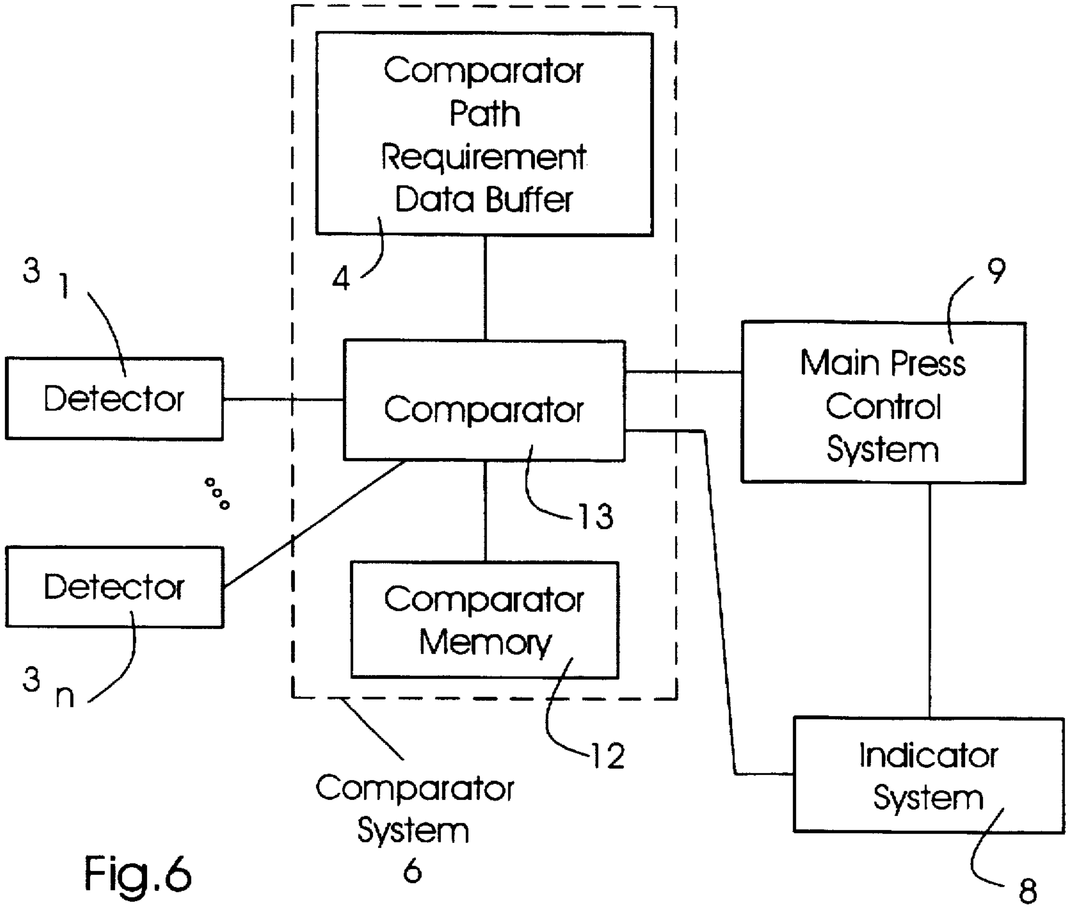
FIG. 6 shows the comparator system of FIG. 5 in more detail. In the comparator system a comparator is connected to comparator memory and a comparator path requirement data buffer.

Each of the rotational detectors $3_{1-n}$ emits an output signal which indicates whether the roll it is associated with is moving and if its rotating the direction it is rotation. (In an alternative embodiment, the rotational detector also emits a signal which indicates the rate at which the roll is rotation.) The output from each of the rotational detectors $3_{1-n}$ is connected to a comparator system 6 as shown in FIG. 5. Comparator system 6 is connected to a main press control system 9, and an indicator system 8. Comparator system 6 is shown in more detail in FIG. 6. In comparator system 6, comparator 13 is connected to comparator memory 12 and to comparator path requirement data buffer 4.

Comparator 13 is also connected to the outputs of detectors $3_{1-n}$, controller 33, which is part of control system 9, and indicator input device 22 and input indicator display device 24, which are part of indicator system 8.

Figure 7:
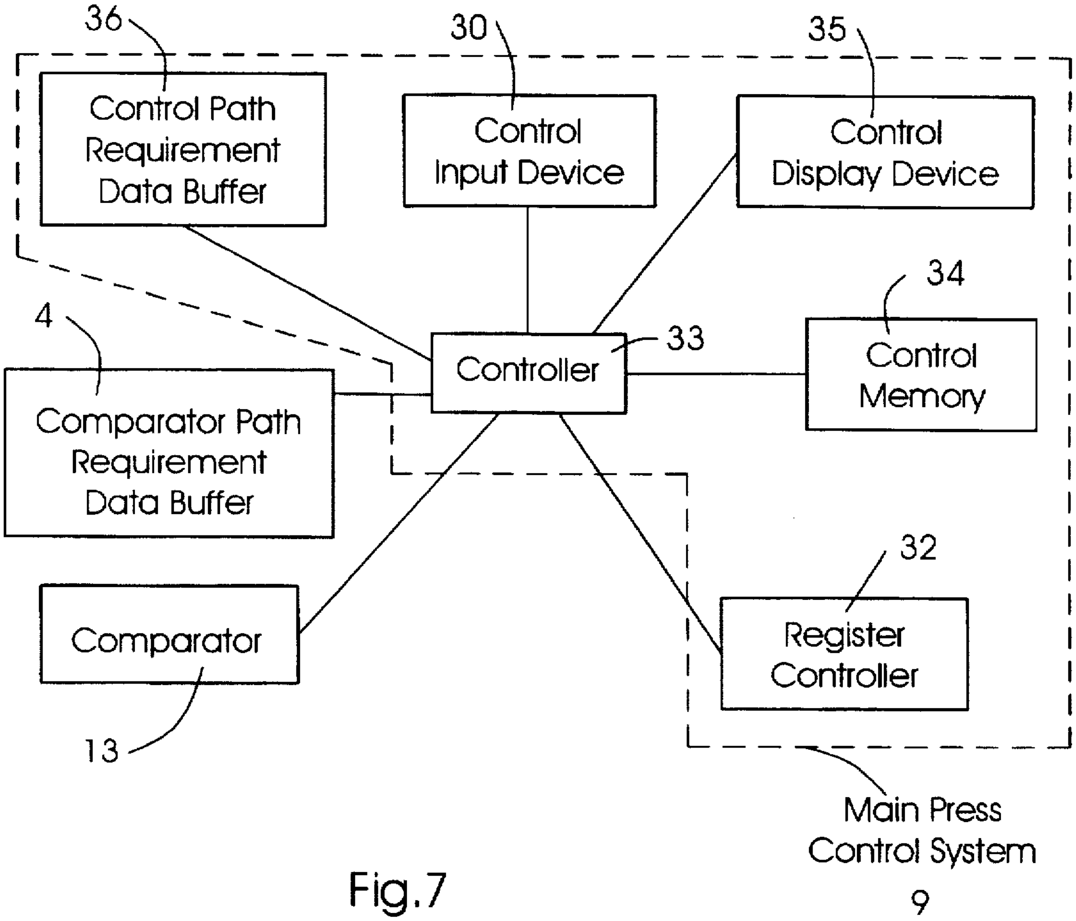
FIG. 7 shows the main press control system of FIG. 5 in more detail. A controller is connected to an input device, control memory, a register controller, an control input device, and a control display device.
Figure 8:
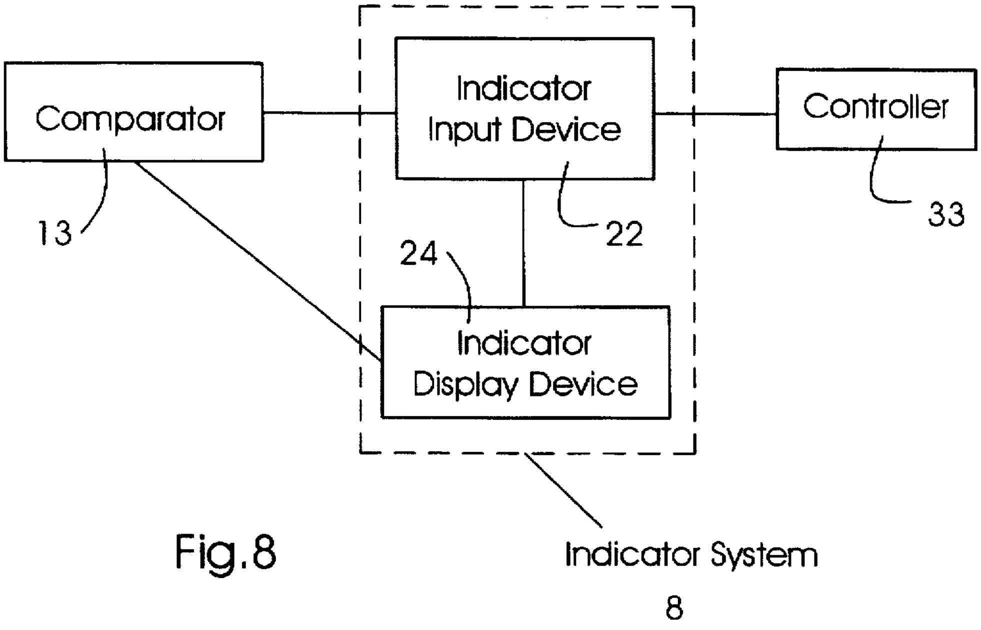
FIG. 8 shows the indicator system of FIG. 5 in more detail. An indicator input device is connected to an indicator display device.

Main press control system 9 is shown in more detail in FIG. 7. The main press control system includes controller 33 and the devices it is connected to: control input device 30, control display device 35, control memory 34, register controller 32, and control path requirement data buffer 36. As shown in FIGS. 7–8 controller 33 is also connected to indicator input device 22, comparator 13, and comparator path requirement data buffer 4. As shown in FIG. 8, indicator system 8 is comprised of indicator input device 22 and indicator display device 24. Indicator input device 22 is connected to indicator display device 24..

In operation the system works as follows. If the pressman wishes to web a ribbon/web path that is different from the ribbon/web path that was previously running on the printing press, he/she enters path requirement data for that path into control path requirement data buffer 3 6. The path requirement data includes information as to which rolls must be engaged (or not engaged) and what direction they must be engaged in. The path requirement data can be entered into control path requirement data buffer 36 by two different means. First, the path requirement data can be entered via input device 30. When the path requirement data is entered via input device 30, controller 33 sends a query that is displayed on control display device 35 asking if the pressman wishes to store the path requirement data in memory. The pressman responds using input device 30. If the pressman indicates that he wishes to store the path requirement data, controller 33 sends a query via control display device 35 asking for a name for the data. After the pressman responds via control input device 30, controller 33 stores the path requirement data with its given name in control memory 34. Accordingly, the second way that path requirement data can be entered into control path requirement data buffer 36 is by retrieving path requirement data that has been stored in control memory 34. Path requirement data that is stored in control memory 34 is entered in control path requirement data buffer 36 when the pressman inputs a retrieve data command via control input device 30.

Control input device 30 passes the command to controller 33. In response to the retrieve data command the controller 33 sends a query via control display device 35 to the pressman. The query asks for the name of the data to be retrieved. The pressman responds by providing the name via control input device 30. The controller then retrieves the data from control memory 34 and enters it into control path requirement data buffer 36.

After the press requirement data is placed in control path requirement data buffer 36, the pressman initiates a comparison between the intended path for a web/ribbon with its actual path by issuing a "compare new path" command at one of two locations: control input device 30 or indicator input device 22. The input device (control input device 30 or indicator input device 22) which receives the compare new path command passes it to controller 33. When controller 33 receives the compare new path command, it loads the path requirement data stored in the control path requirement data buffer 36 into the comparator path requirement data buffer 4. After the control path requirement data is loaded in comparator path requirement data buffer 36, controller 33 instructs comparator 13 to compare the path requirement data stored in the comparator path requirement data buffer 36 with the outputs of the rotational detectors $3_{1-n}$. Comparator 13 makes the comparison and determines what if any mistakes were made in webbing the web/ribbon. Using the path requirement data, comparator 13 also determines whether any of the mistakes were catastrophic. When a mistake is catastrophic (e.g., a particular roll that had to be engaged in particular direction was not engaged in that direction), comparator 13 sends a catastrophic error signal to the controller 33 and to input indicator display device 24. Controller 33 passes the catastrophic error signal to control display device 35. In response to the catastrophic error signal, control display device 35 and indicator display device 22 display a message indicating that a catastrophic error has occurred and rewebbing is required.

If errors occurred in webbing, but none of the errors were catastrophic, comparator 33: stores the outputs of rotational detectors $3_{1-n}$ in comparator memory 12; stores the path requirement data in control path requirement data buffer 36 in comparator memory 12; and sends a noncatastrophic error signal to controller 33. The noncatastrophic error signal includes data as to the noncatastrophic errors that occurred. The controller 33 passes the noncatastrophic error signal to register controller 32. Register controller 32 then adjusts the register controls (e.g., compensators), as is shown in the art to accommodate the deviations from the intended path. After the adjustments are made, the register controller provides a register ready signal to controller 33. In response to the register ready signal, controller 33 causes control display device 35 and indicator display device 24 to display a message informing the pressman that noncatastrophic errors have occurred but that the register has been adjusted for those errors. If no errors occurred in webbing, comparator 13 stores the output of rotational detectors $3_{1-n}$ in memory 12; stores the path requirement data in control path requirement data buffer 36 in comparator memory 12; and sends a no errors signal to control display device 30 (via controller 33) and indicator display device 22. In response, control display device 30 and indicator display device 24 display a message indicating that no error has occurred.

If instead of webbing a new path the pressman decides to reweb the same path as was previously running on the press, as he/she would often want to do after a web break, he/she inputs a reweb command on either one of the two input devices: control input device 30 or indicator input device 24. The reweb command is forwarded by the input devices to comparator 13. In response to the reweb command, comparator 13 compares the stored output in comparator memory 12 to the current outputs of detectors $3_{1-n}$ and determines whether any errors have occurred in rewebbing. (If there is no data in comparator memory 12 indicating what the outputs of detectors $3_{1-n}$ were, then comparator memory 12 via comparator 13 sends a no stored data signal to indicator display device 24 and via controller 33 to control display device 35. In response, control display device 35 and indicator display device 24 display a message indicating the outputs of the detectors were not stored and that path requirement must be entered into comparator 13 and comparator path requirement data buffer 4.) If errors have occurred, comparator 13 uses the path requirement data stored in comparator memory 12 to determine if the errors are catastrophic. If the errors are catastrophic, comparator 13 emits a catastrophic error signal. A statement that a catastrophic error has occurred is then displayed on control display device 35 and indicator display device 24, as described supra for webbings of new paths. After receipt of the catastrophic error signal, the pressman rewebs the web/ribbon. If none of the errors are catastrophic, comparator 13 emits a non-catastrophic error signal. The non-catastrophic error signal is sent to controller 33 and register adjustment is carried out, as described supra for new webbings. Control display device 35 and indicator display device 24 inform the pressman that non-catastrophic errors have occurred but the register has been adjusted for those errors. The outputs of the detectors $3_{1-n}$ and the path requirement data in comparator path requirement data buffer 4 are stored in comparator memory 12 as described supra for new webbings. If no errors have occurred, then a no errors statement is displayed on control display device 35 and indicator display device 24, as described supra for new webbings.

What is claimed is:

1. A web/ribbon verifier for detecting errors in a path of a web/ribbon threaded through a device including a plurality of rollers, the web/ribbon verifier comprising:

a detection system for detecting a current web/ribbon path; and a comparing system for comparing the detected current web/ribbon path to a desired web/ribbon path to detect errors in the current web/ribbon path, wherein the comparing system identifies at which of the rollers of the device errors in the current web/ribbon path have been detected.

2. The web/ribbon path verifier of claim 1, wherein the comparing system determines whether any error detected is a catastrophic error requiring that the web/ribbon be rethreaded through at least a plurality of the rollers of the device.

3. The web/ribbon path verifier of claim 2 further comprising means for correcting errors which are not determined to be catastrophic errors.

4. The web/ribbon path verifier of claim 3, wherein the means for correcting non-catastrophic errors includes a register controller for adjusting the register to correct for noncatastrophic errors.

5. The web/ribbon path verifier of claim 1 wherein the detection system comprises at least one rotational detector for detecting a direction of rotation of at least one of the rollers.

6. The web/ribbon path verifier of claim 5 wherein the at least one rotational detectors is a quadrature.

7. The web/ribbon path verifier of claim 5, wherein the comparing system includes a memory for storing output signals from the at least one rotational detector.

8. The web/ribbon path verifier of claim 5, wherein output signals from the at least one rotational detector is compared to data representative of the desired web/ribbon path to detect errors in the current web/ribbon path.

9. The web/ribbon path verifier of claim 8, wherein the comparing system uses the comparison of the stored output signals to the data representative of the desired web/ribbon path to determine whether any errors detected are catastrophic errors.

10. The web/ribbon path verifier of claim 1, wherein the comparing system includes means for storing data corresponding to at least one desired web/ribbon path.

11. The web/ribbon path verifier of claim 1, further comprising:

a plurality of detectors, each detector producing an output signal corresponding to a rotational direction of a corresponding one of the rollers, wherein the comparing system compares the output signals from the plurality of detectors to data corresponding to the desired web/ribbon path.

12. The web/ribbon path verifier of claim 1 wherein the comparing system includes a comparator.

13. The web/ribbon path verifier of claim 1, further comprising a memory for storing data corresponding to at least one desired web/ribbon path and a controller that stores and retrieves data from the memory.

14. A method for verifying a web/ribbon path for detecting errors in a path of a web/ribbon threaded through a device including a plurality of rollers, the method comprising the steps of:

detecting a current web/ribbon path;

comparing the detected current web/ribbon path to a desired web/ribbon path to detect errors in the current web/ribbon path, wherein the comparing system identifies at which of the rollers of the device errors in the current web/ribbon path have been detected; and determining whether any of the detected errors are catastrophic errors which require rethreading the web/ribbon through the device.

15. The method of claim 14 further comprising the step of correcting noncatastrophic errors by adjusting a register of at least one roller.

16. A method for verifying rewebbing of a web/ribbon path for detecting errors in a path of a web/ribbon threaded through a device including a plurality of rollers and a corresponding plurality of rotational detectors coupled to the rollers, the method comprising the steps of:

analyzing output signals from the rotational detectors to determine a current web/ribbon path; and comparing the current web/ribbon path to data representative of a desired web/ribbon path to detect errors in the current web/ribbon path and to locate the errors along the web/ribbon path.

* * * * *